May 16, 1939.  R. C. KIRK  2,158,786
METHOD OF PRODUCING MAGNESIUM
Filed April 27, 1938
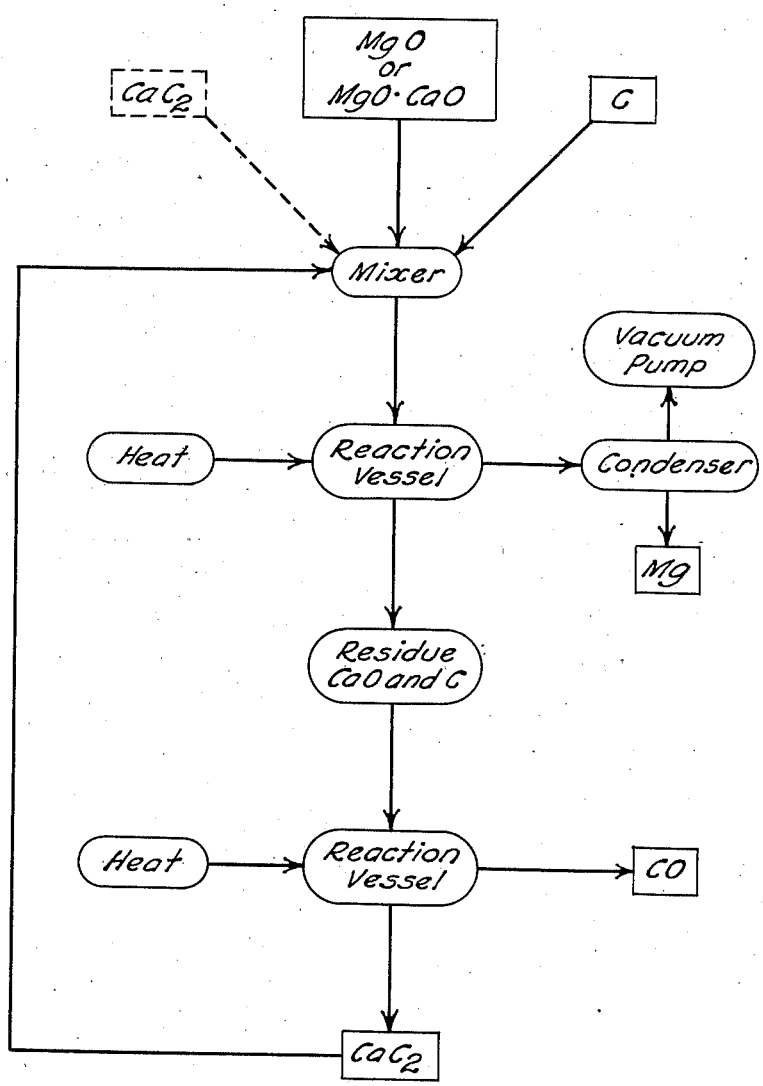
INVENTOR.
Roy C. Kirk
BY Griswold & Burdick
ATTORNEYS.

Patented May 16, 1939

2,158,786

UNITED STATES PATENT OFFICE 2,158,786

METHOD OF PRODUCING MAGNESIUM

Roy C. Kirk, Midland, Mich., assignor to The Dow Chemical Company, Midland, Mich., a corporation of Michigan Application April 27, 1938, Serial No. 204,516

8 Claims. (Cl. 75—67)

The invention relates to methods of thermally reducing magnesium oxide materials. It more particularly concerns an improvement in the art of producing metallic magnesium by thermal reduction of a magnesium oxide containing material employing calcium carbide as the reducing agent.

One of the objects of the invention is to provide a method of reducing a magnesium oxide containing material such as calcined dolomite or magnesium oxide itself in which the ingredients for the reducing agent, calcium carbide, required for the reduction are prepared simultaneously with the reducing operation and subsequently converted into calcium carbide for use in the reduction.

Other objects and advantages will become apparent from the following description taken in conjunction with the accompanying drawing which is a schematic diagram illustrating a mode of carrying out the invention.

According to the invention the magnesium oxide containing material such as calcined magnesite (MgO) or calcined dolomite (MgO.CaO) in divided form is intimately mixed with divided calcium carbide (CaC$_2$) and carbon in suitable proportions and the mixture is heated in the absence of air to a temperature sufficient to liberate metallic magnesium, preferably under sub-atmospheric pressure. The magnesium vapor thereby produced is condensed upon a suitable cooled surface such as iron or steel. After the magnesium has been thus liberated from the reaction mixture the residue comprising calcium oxide and carbon is then heated to a higher temperature whereby calcium carbide is formed, the calcium carbide so produced being reused in the process.

The reactions I have found to take place in carrying out the foregoing process are shown by the equations below according to whether magnesium oxide alone or calcined dolomite is employed as the magnesium oxide containing material. When magnesium oxide is used, the reaction on liberating magnesium is:

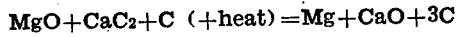

then after the magnesium has been liberated and the solid residue CaO+3C is further heated to a higher temperature the reaction is:

When calcined dolomite is used the corresponding reactions are:

and

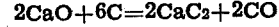

By the foregoing method thus briefly described, I have found magnesium is liberated as vapor from magnesium oxide containing materials without the usual carbon monoxide formation which accompanies the known processes when such materials are heated in the presence of carbon. Instead the carbon which is added to the reaction mixture becomes a part of the calcium oxide residue after the magnesium is liberated, and together with the carbon then produced, forms an intimate mixture with calcium oxide in the proportions required to make calcium carbide for use in the process. This has the advantage of not only conserving heat but also of avoiding the necessity for either comminuting the calcium oxide or of mixing it with the carbon to make calcium carbide required for the reduction.

In carrying out the invention the magnesium oxide containing material is preferably finely ground and the calcium carbide and carbon are suitably granulated or pulverized and then intimately mixed in approximately the proportions of 1 mole of carbon per mole of magnesium oxide in the magnesium oxide material together with at least 1 mole of calcium carbide as indicated by the foregoing equations, although somewhat better yields of magnesium are obtained by employing a substantial excess of calcium carbide, such as up to 1.6 moles of calcium carbide for each mole of magnesium oxide in the reaction mixture. If the magnesium oxide material contains CaO as when calcined dolomite is used, then an additional 3 moles of carbon is added to the reaction mixture for each mole of CaO therein. The mixture is placed in a suitable reaction vessel or furnace and then heated under sub-atmospheric pressure to a sufficient temperature to liberate metallic magnesium but below that substantially liberating carbon monoxide. Gases which may be driven off the mixture while it is being brought up to temperature are pumped off before the magnesium is liberated. The heating operation may be carried out in an electrically heated furnace. A suitable furnace comprises a crucible for holding the reaction mixture of a material, preferably non-reactive to magnesium such as graphite which is surrounded by a gas tight metal shell, the shell being cooled by a water jacket so as to act as a condensing surface for the vaporized magnesium, as shown in the prior application of Charles E. Nelson and John S. Peake, Serial No. 103,604, filed October 1, 1936. When the reaction mixture attains a temperature of about 1050° C. magnesium vapor begins to be liberated and such liberation proceeds with increasing rapidity as the temperature is raised to 1350° C. or more. The magnesium vapor is condensed to liquid or solid magnesium on the condensing surface. At these higher temperatures carbon monoxide tends to be liberated so that the reaction temperature should be maintained preferably just below that at which any substantial amount of carbon monoxide would be liberated, i. e. at temperatures below about 1400° C.

After the magnesium has been liberated from the heated reaction mixture, the residue comprising calcium oxide and carbon, which is suitable for producing calcium carbide, is then preferably transferred while still hot to a separate reaction vessel, such as a carbide furnace, and further heated to a higher temperature so as to bring about the formation of calcium carbide. To effect this reaction the temperature is raised to between about 1800° C. and 2500° C.

The calcium carbide thus produced preferably while still hot is reused in the process by mixing it with a further quantity of magnesium oxide containing material and carbon in suitable proportions and then heated to produce magnesium as previously described. When calcined dolomite is used instead of magnesium oxide one mole of calcium carbide is obtained as a by-product for each mole of magnesium produced. When magnesium oxide alone is used all the calcium carbide produced is reused in the process.

The following example is illustrative of a mode of carrying out the invention:

60 parts of finely divided calcined dolomite, 37.7 parts of graphite ground to between about 40 and 60 mesh, and 52 parts of calcium carbide (containing 77 per cent of $CaC_2$ and 23 per cent of CaO) ground to between about 20 and 40 mesh, were intimately mixed and placed in an electrically heated furnace comprising a graphite crucible surrounded by a vacuum tight, water cooled steel shell. The interior of the shell was connected to a vacuum pump which removed air and water vapor while the mixture was being heated to the reaction temperature. When the temperature reached 1080° C. the pressure in the furnace was about 0.08 inch of mercury and magnesium began to condense on the cooled steel shell as a substantially pure crystalline deposit. The heating was continued for about two hours, the temperature during this time being gradually raised to 1400° C. while the vacuum pump maintained the pressure in the vessel below about 0.2 inch of mercury. At the end of the time 12.1 parts of substantially pure magnesium had condensed on the steel shell, the yield of magnesium being about 83.4 per cent of that in the raw material. The residue after thus liberating the magnesium was removed from the crucible and transferred to a similar but unjacketed graphite heating vessel where it was heated to about 2500° C. producing 87.7 parts of calcium carbide.

Other modes of applying the principle of my invention may be employed instead of the one explained, change being made as regards the method herein disclosed, provided the steps stated by any of the following claims or the equivalent of such stated steps be employed.

I therefore particularly point out and distinctly claim as my invention:

1. In a method of producing magnesium by thermal reduction of a material comprising its oxide employing calcium carbide as the reducing agent, the steps which comprise mixing the material to be reduced with calcium carbide and carbon in the approximate proportions of 1 mole of carbon and at least 1 mole of calcium carbide per mole of magnesium oxide in said material, and heating the mixture to a temperature capable of liberating magnesium vapor but below that substantially liberating carbon monoxide, whereby a residue is obtained containing calcium oxide and carbon suitable for producing calcium carbide upon further heating.

2. In a method of producing magnesium by thermal reduction of a material comprising its oxide and calcium oxide employing calcium carbide as the reducing agent, the steps which comprise mixing the material to be reduced with calcium carbide and carbon in the approximate proportions of 1 mole of carbon and at least 1 mole of calcium carbide per mole of magnesium oxide in said material plus 3 moles of carbon per mole of calcium oxide in said material to be reduced, and heating the mixture to a temperature capable of liberating magnesium but below that substantially liberating carbon monoxide whereby a residue is obtained containing calcium oxide and carbon suitable for producing calcium carbide upon further heating.

3. In a method of producing magnesium by thermal reduction of a material comprising its oxide employing calcium carbide as the reducing agent, the steps which comprise mixing the material to be reduced with calcium carbide and carbon in the approximate proportions of 1 mole of carbon and at least 1 mole of calcium carbide per mole of magnesium oxide in said material, heating the mixture under sub-atmospheric pressure to a temperature capable of liberating magnesium vapor but below that substantially liberating carbon monoxide, and condensing the magnesium vapor whereby a residue is obtained containing calcium oxide and carbon suitable for producing calcium carbide upon further heating.

4. In a method of producing magnesium by thermal reduction of a material comprising its oxide employing calcium carbide as the reducing agent, the steps which comprise mixing the material to be reduced with calcium carbide and carbon in the approximate proportions of 1 mole of carbon and at least 1 mole of calcium carbide per mole of magnesium oxide in said material, heating the mixture to a temperature capable of liberating magnesium vapor but below that substantially liberating carbon monoxide until the magnesium oxide is reduced, further heating the resulting residue to a temperature capable of liberating carbon monoxide whereby calcium carbide is formed, and returning calcium carbide so obtained to the first step.

5. In a method of producing megnesium by thermal reduction of a material comprising its oxide and calcium oxide employing calcium carbide as the reducing agent, the steps which comprise mixing the material to be reduced with calcium carbide and carbon in the approximate proportions of from 1 to 1.6 moles of calcium carbide and 1 mole of carbon per mole of magnesium oxide in said material plus at least 3 moles of carbon per mole of calcium oxide in said material to be reduced, heating the mixture to a temperature capable of liberating magnesium vapor but below that substantially liberating carbon monoxide until the magnesium oxide is reduced, further heating the residue to a temperature capable of liberating carbon monoxide whereby calcium carbide is formed, and returning calcium carbide so obtained to the first step.

6. In a method of producing magnesium by thermal reduction of a material comprising its oxide and calcium oxide employing calcium carbide as the reducing agent, the steps which comprise mixing the material to be reduced with calcium carbide and carbon in the approximate proportions of 1 mole of carbon and at least 1 mole of calcium carbide per mole of magnesium oxide in said material plus 3 moles of carbon per mole of calcium oxide in said material to be reduced, heating the mixture to a temperature capable of liberating magnesium vapor but below that substantially liberating carbon monoxide, and condensing the magnesium vapor, whereby a residue is obtained containing calcium oxide and carbon suitable for producing calcium carbide upon further heating.

7. In a method of producing magnesium by thermal reduction of calcined dolomite employing calcium carbide as the reducing agent, the steps which comprise mixing calcined dolomite with calcium carbide and carbon in the approximate proportions of from 1 to 1.6 moles of calcium carbide and 1 mole of carbon per mole of magnesium oxide in said calcined dolomite plus 3 moles of carbon per mole of calcium oxide in said calcined dolomite, heating the mixture to a temperature between 1050° and 1350° C. until the magnesium oxide is reduced, further heating the residue to a temperature above 1800° C., whereby carbon monoxide is liberated and calcium carbide is formed, and returning calcium carbide so obtained to the first step.

8. In a method of producing magnesium by thermal reduction of calcined dolomite employing calcium carbide as the reducing agent, the steps which comprise mixing calcined dolomite with calcium carbide and carbon in the approximate proportions of from 1 to 1.6 moles of calcium carbide and 1 mole of carbon per mole of magnesium oxide in said calcined dolomite plus 3 moles of carbon per mole of calcium oxide in said calcined dolomite, heating the mixture to a temperature between 1050° and 1350° C. until the magnesium oxide is reduced and magnesium vapor is liberated, condensing the magnesium vapor, further heating the residue to a temperature above 1800° C. whereby carbon monoxide is liberated and calcium carbide is formed, and returning calcium carbide so obtained to the first step.

ROY C. KIRK.